United States Patent [19]

Dudzik et al.

[11] 4,444,839

[45] Apr. 24, 1984

[54] WATER-SOLUBLE LABEL, A PROCESS FOR ITS PREPARATION AND ITS USE

[75] Inventors: Joachim Dudzik; Winfried Dudzik, both c/o Hoechst Aktiengesellschaft, D-6230 Frankfurt am Main, Fed. Rep. of Germany; Wolfgang Zimmermann, Kelkheim; Günther Pospich, Frankfurt am Main, both of Fed. Rep. of Germany

[73] Assignees: Hoechst Aktiengesellschaft; Joachim Dudzik; Winfried Dudzik, all of Frankfurt am Main, Fed. Rep. of Germany

[21] Appl. No.: 308,235

[22] Filed: Oct. 2, 1981

[30] Foreign Application Priority Data

Oct. 4, 1980 [DE] Fed. Rep. of Germany ....... 3037640

[51] Int. Cl.[3] ....................... B32B 27/08; B41M 3/12; C09J 7/02; G09F 3/00

[52] U.S. Cl. ...................................... 428/336; 40/310; 156/231; 156/240; 156/244.18; 427/149; 428/340; 428/346; 428/349; 428/350; 428/352; 428/354; 428/355

[58] Field of Search ............... 428/346, 349, 350, 352, 428/354, 202, 355, 40, 336, 340; 427/149; 156/231, 236, 240, 244.11, 244.18; 40/310

[56] References Cited

U.S. PATENT DOCUMENTS

| | | | |
|---|---|---|---|
| 2,348,220 | 1/1941 | Kline | 428/355 |
| 2,578,150 | 12/1951 | Rathke | 428/350 X |
| 2,654,170 | 10/1953 | Nestor | 40/310 |
| 2,793,966 | 5/1957 | Davis | 428/350 |
| 3,592,682 | 7/1971 | Weiner et al. | 428/350 |
| 4,258,092 | 3/1981 | Labar | 428/352 X |

FOREIGN PATENT DOCUMENTS

| | | |
|---|---|---|
| 2721120 | 11/1978 | Fed. Rep. of Germany . |
| 2061639 | 6/1971 | France . |

*Primary Examiner*—Thomas J. Herbert, Jr.
*Attorney, Agent, or Firm*—Curtis, Morris & Safford

[57] ABSTRACT

A label essentially comprises a top layer which can be printed and/or inscribed and a water-soluble adhesive layer. The adhesive layer can also be protected by a covering layer. The top layer is formed from polyvinyl alcohol which is preferably insoluble in cold water but soluble in hot water. The adhesive layer comprises a synthetic adhesive which is soluble in water and represents, in particular, a contact adhesive or permanent adhesive. The label is resistant to the action of cold water but is soluble in hot water, and is suitable for labeling containers with a smooth surface.

11 Claims, 1 Drawing Figure

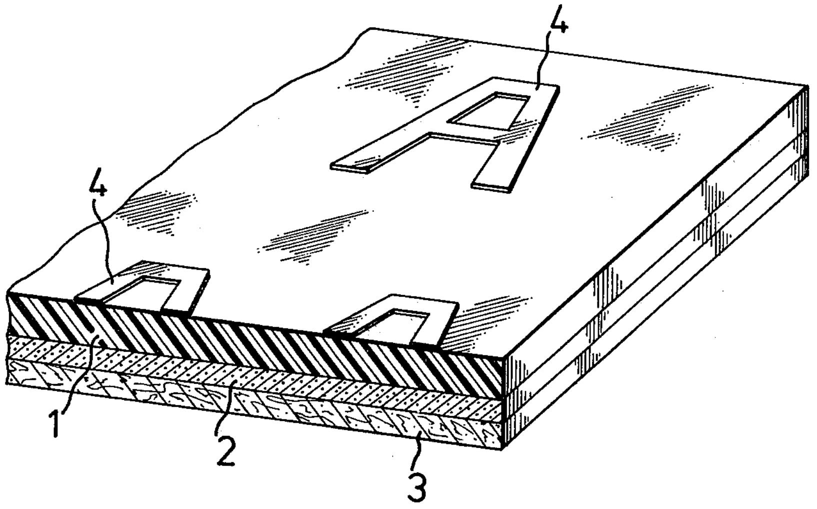
4
4
1
2
3

WATER-SOLUBLE LABEL, A PROCESS FOR ITS PREPARATION AND ITS USE

The invention relates to a water-soluble label which comprises a top layer which can be printed and/or inscribed and a water-soluble adhesive layer and, if appropriate, a covering layer protecting the adhesive layer, and to a process for the preparation of this label and the use of the label.

A self-adhesive label with a layer which can be printed and/or inscribed and which consists of cellulose-containing or textile material and a pressure-sensitive, water-soluble adhesive layer is already known (see German Auslegeschrift No. 2,635,643). In this label, the layer which can be printed comprises a material with a fiber structure which is soluble in water, and the layer bears a coating which is not wettable by water but is permeable to water. The known self-adhesive label is used for labeling drink barrels, particularly beer barrels made of aluminum, as well as drink bottles and medicament bottles.

A modification of the self-adhesive label described comprises the coating being transparent, being resistant to the action of water at a relatively low temperature, up to a limiting temperature, and having a structure which, at relatively high temperatures, becomes detached under the action of water and/or dissolves in water and/or is permeable to water (see German Offenlegungsschrift No. 2,721,120). The coating comprises a material which, below the limiting temperature, seals the pores of the layer to be printed and encloses the fibers thereof in a water-tight manner for example wax, linseed oil varnish or waterglass. The limiting temperature is 30° to 60° C.

The object of the invention is to provide a self-adhesive label which is resistant to cold water and is detachable or soluble with the aid of hot water, and can be prepared in a simple and economical manner.

The invention relates to a water-soluble label comprising a top layer which can be printed and/or inscribed and a water-soluble adhesive layer and, if appropriate, a covering layer protecting the adhesive layer, wherein the top layer is composed of polyvinyl alcohol and the adhesive layer comprises a synthetic adhesive which is soluble in water.

The essential characteristic of the label according to the invention is the fact that the top layer of the label (top material) comprises polyvinyl alcohol; this is preferably insoluble in cold water and soluble in hot water. The polyvinyl alcohol is optionally also soluble in cold water or has a retarded solubility in cold water. In this context, "cold" is to be understood as meaning a temperature of at most 30° C., and "hot" is to be understood as meaning a temperature of at least 50° C. It is particularly advantageous for the detachability of the label if the top layer retains its shape in cold water and is capable of shrinking in hot water.

The polyvinyl alcohol used according to the invention is prepared in a known manner by the hydrolysis, preferably by the alcoholysis, of polyvinyl esters, preferably polyvinyl acetate (see, for example, German Patent Specification No. 1,720,709—British Patent Specification No. 1,168,757). The 4 percent strength by weight aqueous solution of the polyvinyl alcohol has a viscosity of from 4 to 70 mPa.s, preferably from 10 to 60 mPa.s (measured at a temperature of 20° C.). The ester number of the polyvinyl alcohol is in the range of from 10 to 250 mg of KOH/g, preferably from 20 to 200 mg of KOH/g.

The adhesive layer of the label comprises a synthetic adhesive which is soluble in water. The adhesive is a contact adhesive or a permanent adhesive; the latter can preferably be activated by water and/or heat. The adhesive layer has a weight per unit area of from 5 to 25 g/m$^2$, preferably from 10 to 20 g/m$^2$.

The adhesive is, in particular, an organic polymer, preferably a vinyl polymer. For example, polyvinyl esters, such as polyvinyl acetate, polyvinyl propionate and vinyl acetate copolymers, polyvinyl ethers, such as polyvinyl methyl ether, polyvinyl acetals, such as polyvinyl butyral, and polyvinyl alcohol are suitable. In particular, polyvinyl alcohol which is soluble in cold water is suitable as the adhesive if the top layer comprises a polyvinyl alcohol which is insoluble in cold water but soluble in hot water.

The adhesive layer is protected, if appropriate, by a covering layer, particularly when a contact adhesive is used. The covering layer comprises a covering film, preferably a covering paper, such as siliconized paper, which can easily be peeled off from the adhesive layer.

The invention also relates to a process for the preparation of a water-soluble label which comprises a top layer which can be printed and/or inscribed and a water-soluble adhesive layer and, if appropriate, a covering layer protecting the adhesive layer, and wherein a film of polyvinyl alcohol is coated on one side with an adhesive, the adhesive layer obtained is backed, if appropriate, with a covering layer, and the label is stamped out from the laminated sheet obtained.

The polyvinyl alcohol film used as the top layer is prepared in a casting process or, preferably, by extrusion blow molding. It has a thickness of from 10 to 150 μm, preferably from 20 to 100 μm. The polyvinyl alcohol film is normally transparent; however it can also be colored if, in particular, a polyvinyl alcohol is used which contains a pigment or an organic colorant. The quantity of the pigment is then from 1 to 10 percent by weight, preferably from 2 to 5 percent by weight (relative to the polyvinyl alcohol), whilst the quantity of the colorant is in the range of from 0.5 to 5 percent by weight, preferably from 1 to 3 percent by weight (relative to the polyvinyl alcohol). Titanium dioxide as well as kaolin, chalk and satin white are particularly suitable as the pigment, whilst customary foodstuff colorants and cosmetic colorants can be used as the colorants.

The adhesive layer on the polyvinyl alcohol film is formed, in general, by applying the adhesive, in the form of a solution or an aqueous dispersion, onto the film and then removing the solvent or the dispersing agent; in this process, water or a water-miscible organic solvent, for example acetone, methanol or ethanol, is employed as the solvent, whilst water is used as the dispersing agent.

A particularly simple and preferred modification of the process according to the invention comprises simultaneously producing, in a co-extrusion process, a film composed of a polyvinyl alcohol which is insoluble in cold water and soluble in hot water and a film composed of a polyvinyl alcohol which is soluble in cold water, and combining the films with one another, for example with the aid of rollers.

The water-soluble label according to the invention is preferably used for labeling containers which have smooth surfaces and which are periodically subjected to the action of cold water. Such containers are, in particular, barrels and buckets composed of metal, and bottles composed of glass, porcelain or earthenware, which are used for storing drinks, foodstuffs or medicaments. The label is distinguished in that it is not detached from the container by the action of condensation water, sprayed water or rainwater or aqueous liquids below a temperature of 30° C., but can be detached and dissolved, without problems, using water which has a temperature of about 50° C. The detachment of the label is facilitated by the fact that the polyvinyl alcohol top layer shrinks with the action of hot water.

BRIEF DESCRIPTION OF THE DRAWING

A label according to the invention is represented in cross-section the FIGURE. It comprises the top layer 1 which is associated with the adhesive layer 2. The adhesive layer 2 is protected by the covering layer 3. The top layer 1 is provided with a surface print 4.

The examples which follow serve to illustrate the invention in more detail. Percentage data relate to weight.

EXAMPLE 1

6 kg of a commercial granulated polyvinyl alcohol, which has an ester number of 20 mg of KOH/g and the 4 percent strength aqueous solution of which has a viscosity of 20 mPa.s, are mixed with 1.5 kg of glycerine, 0.9 kg of water and 180 g of titanium dioxide until the mixture is homogeneous. The mixture obtained is extruded on a single screw extruder to give a white non-transparent blown film, the thickness of which is 30 μm. The film is insoluble in water at a temperature of 30° C. but is soluble at 70° C.

The polyvinyl alcohol film is then coated on one side, with the aid of a doctor blade, with a 50 percent strength solution of a commercial polyvinyl methyl ether in acetone. After the acetone has evaporated off, an adhesive layer with a weight per unit area of 15 $g/m^2$ is obtained, which adhesive layer is immediately backed with a siliconized paper, with the aid of a pressure roller. Rectangular labels are then stamped out from the laminated sheet obtained and are printed.

The labels are stuck onto glass bottles, after the covering paper has been peeled off. The bottles are stored for 12 hours in water at a temperature of 20° C. without the labels becoming detached. If the labeled bottles are treated with water at 70° C., the labels first become detached from the surface of the bottles within 10 seconds by spontaneous shrinking, and dissolve after a further 60 seconds.

EXAMPLE 2

A polyvinyl alcohol film prepared according to Example 1 is coated, with the aid of a doctor blade, with a 55 percent strength aqueous commercial polyvinyl acetate dispersion. After the water has evaporated off, an adhesive layer with a weight per unit area of 10 $g/m^2$ is obtained. Labels are then stamped out from the coated film and are printed.

The labels are stuck onto an aluminum barrel after the adhesive layer had been moistened with water. After the labels have dried on, the barrel is stored for 12 hours in water at a temperature of 30° C., without the labels becoming detached. After the barrel is treated with water at 70° C., the labels become detached without problems and dissolve.

EXAMPLE 3

6 kg of a commercial granulated polyvinyl alcohol, which has an ester number of 90 mg of KOH/g and the 4 percent strength aqueous solution of which has a viscosity of 30 mPa.s, are mixed with 1 kg of glycerine, 0.3 kg of water and 180 g of titanium dioxide, until the mixture is homogeneous. The mixture obtained is extruded on a single screw extruder to give a white non-transparent blown film, the thickness of which is 40 μm. The film is insoluble in water at a temperature of 30° C. but soluble at 70° C.

The polyvinyl alcohol film is then provided, according to Example 1, with an adhesive layer, this layer is backed, and labels are stamped out.

The labels are stuck onto porcelain pots, after the covering paper has been peeled off. The pots are stored for 12 hours in water at a temperature of 20° C., without the labels becoming detached. After the pots have been treated with water at 70° C., the labels become detached without problems and dissolve.

EXAMPLE 4

A commercial polyvinyl alcohol, which has an ester number of 10 mg of KOH/g and the 4 percent strength aqueous solution of which has a viscosity of 28 mPa.s, is dissolved in water at 85° C. to give a 20 percent strength solution. The solution is filtered and is poured onto an endless circulating plastic belt; during this process, the thickness of the film is adjusted with the aid of a doctor blade. The plastic belt passes through a drying channel in which the water evaporates. A cast film which is as clear as glass and which has a thickness of 50 μm is obtained at the end of the plastic belt. The film is insoluble in water at a temperature of 30° C. but is soluble at 70° C.

The polyvinyl alcohol film is then provided, according to Example 1, with an adhesive layer, this layer is backed, and labels are stamped out.

The labels are stuck onto glass bottles after the backing paper has been peeled off. The bottles are stored for 12 hours in water at a temperature of 30° C., without the labels becoming detached. If the labeled bottles are treated with water at 70° C., the labels become detached without problems and dissolve in the hot water.

EXAMPLE 5

A polyvinyl alcohol, which has an ester number of 10 mg of KOH/g and the 4 percent strength aqueous solution of which has a viscosity of 28 mPa.s, is dissolved in water at 85° C. to give a 20 percent strength solution. 5% of titanium dioxide (relative to the polyvinyl alcohol) is suspended in this solution. A film is prepared from this suspension, according to Example 4. The film has a milky-white color and has a thickness of 50 μm. It is insoluble in water at a temperature of 30° C. but soluble at 70° C.

The polyvinyl alcohol film is then provided, according to Example 2, with an adhesive layer, this layer is backed, and labels are stamped out.

The adhesive layer of the labels is moistened with water, and the labels are stuck onto glass bottles. After the labels have dried on, the glass bottles are stored for 12 hours in water at a temperature of 20° C., without the labels becoming detached. If the labeled bottles are treated with water at 70° C., the labels become detached without problems and then dissolve.

We claim:

1. A water-soluble label comprising a top layer comprised of polyvinyl alcohol having a viscosity of from 4 to 70 mPa.s, an ester number of 10 to 250 mg KOH/g and a thickness of from 10 to 150 μm, said top layer adapted to be printed or inscribed thereon; and a water-soluble adhesive layer which is adjacent said top layer is a vinyl polymer and has a weight per unit area of from 5 to 25 g/m$^2$.

2. A label as claimed in claim 1, wherein the polyvinyl alcohol forming the top layer is insoluble in cold water and soluble in hot water.

3. A label as claimed in claim 1, wherein the top layer retains its shape in cold water and is capable of shrinking in hot water.

4. The label, as claimed in claim 1, further including a protective layer covering the adhesive layer.

5. A label as claimed in claim 1, wherein the adhesive is a contact adhesive or a permanent adhesive.

6. A label as claimed in claim 5, wherein the permanent adhesive is capable of being activated by water or heat.

7. A label as claimed in claim 1, wherein the polyvinyl alcohol forming the top layer is soluble in cold water.

8. A label as claimed in claim 7, wherein the polyvinyl alcohol forming the top layer has a retarded solubility in cold water.

9. A process for the preparation of a water-soluble label which is adapted to be printed or inscribed thereon comprising coating a film composed of polyvinyl alcohol having a viscosity of from 4 to 70 mPa.s and an ester number of from 10 to 250 mg KOH/g, said film having a thickness of from 10 to 150 μm, with an adhesive layer containing a vinyl polymer, said adhesive layer having a weight per unit area of from 5 to 25 g/m$^2$ to obtain a laminated sheet; and stamping out a label from the laminated sheet.

10. The process, as claimed in claim 9, further comprising applying a protective covering layer to the adhesive layer.

11. A process for labeling a container which has a substantially smooth surface and is periodically subjected to the action of water which comprises applying the water soluble label according to claim 1 to said container.

* * * * *